Figure 1:
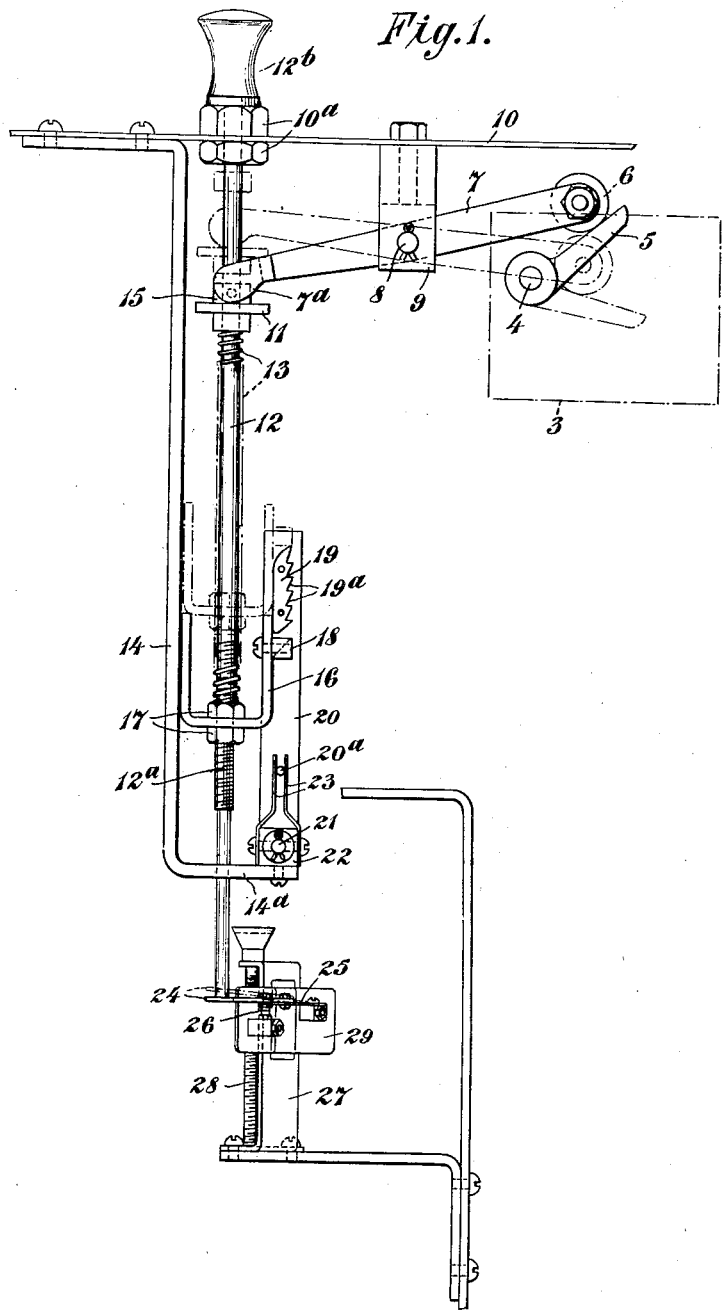

Dec. 9, 1941.    A. BINNS    2,265,718
ZEROIZING MEANS FOR TOTALIZING APPARATUS
Filed Sept. 3, 1938    2 Sheets-Sheet 2

Inventor:-
Arthur Binns.
Per:- George J. Folkes
Attorney.

Patented Dec. 9, 1941

2,265,718

UNITED STATES PATENT OFFICE 2,265,718

ZEROIZING MEANS FOR TOTALIZING APPARATUS

Arthur Binns, Birmingham, England, assignor to W. & T. Avery Limited, Birmingham, England Application September 3, 1938, Serial No. 228,443 In Great Britain September 8, 1937

1 Claim. (Cl. 235—129)

This invention has reference to improvements relating to zeroizing means for totalizing apparatus and is concerned particularly with zeroizing means for totalizing apparatus used in conjunction with indicating mechanism of the kind described and claimed in the specification of my pending patent application No. 104,249, dated October 6, 1936, now Patent No. 2,173,575, issued September 19, 1939.

In order that the present invention may be the better understood it should be recalled that in the indicating mechanism described in my aforesaid patent specification a secondary pointer is coupled magnetically to the indicating pointer of an automatic indicating mechanism so as to move with the indicating pointer during the movement thereof to the indicating position and that the said secondary pointer is also associated with an electro-magnetic clutch which is utilized to effect simultaneously the breaking of the magnetic connection between the secondary pointer and the indicating pointer and the clutching of the said secondary pointer to an electric motor which is simultaneously brought into operation and caused to effect the actuation of a totalizing apparatus, the electric motor remaining in operation until it has effected the return of the secondary pointer to the initial position and so actuated the totalizing apparatus to an extent governed by the position to which the secondary pointer has been moved during its association with the indicating pointer thus effecting a totalizing of the load, and that the bringing into operation of the electro-magnetic clutch is determined either by a switch which comes into operation automatically to complete the circuit after a predetermined period of time has elapsed subsequent to the commencement of the indicating operation, or by the completion of a circuit by the arbitrary manipulation of a manually operable switch.

It is experienced in practice that it is required under some conditions of working to provide for the zeroizing of the totalizing apparatus at the will of the operator, and the present invention has for its object the provision of an improved means which enables zeroizing of the totalizing apparatus to be effected when desired, but which ensures that once a zeroizing operation has been initiated the zeroizing operation must be completed before the indicating mechanism can again be effectively employed.

The invention consists of a zeroizing means for totalizing apparatus employed in conjunction with indicating mechanism of the kind herein referred to, characterized in that the zeroizing means is associated with an electric switch mechanism which is embodied in the circuit which controls the operation of the electromagnetic clutch for disconnecting the secondary pointer from the indicating pointer of the aforesaid indicating mechanism, so that on the actuation of the said zeroizing means the circuit through the control switch is maintained broken until the said means has been actuated to an extent which ensures that a complete zeroizing operation has been performed.

The invention further resides in the details of construction of the zeroizing mechanism for totalizing apparatus to be described hereinafter.

This invention will now be described with reference to the accompanying drawings which illustrate a preferred construction and arrangement of a zeroizing means for a weight totalizing apparatus incorporated with a weighing scale having an indicating mechanism constructed, arranged and operated as described and illustrated in the aforesaid Patent No. 2,173,575.

In the drawings Figure 1 is a front elevation of the totalizing zeroizing mechanism associated with a switch which controls the circuit through the weight-indicating mechanism, this figure illustrating in dotted lines alternative positions of certain parts of the mechanism.

Figure 2:
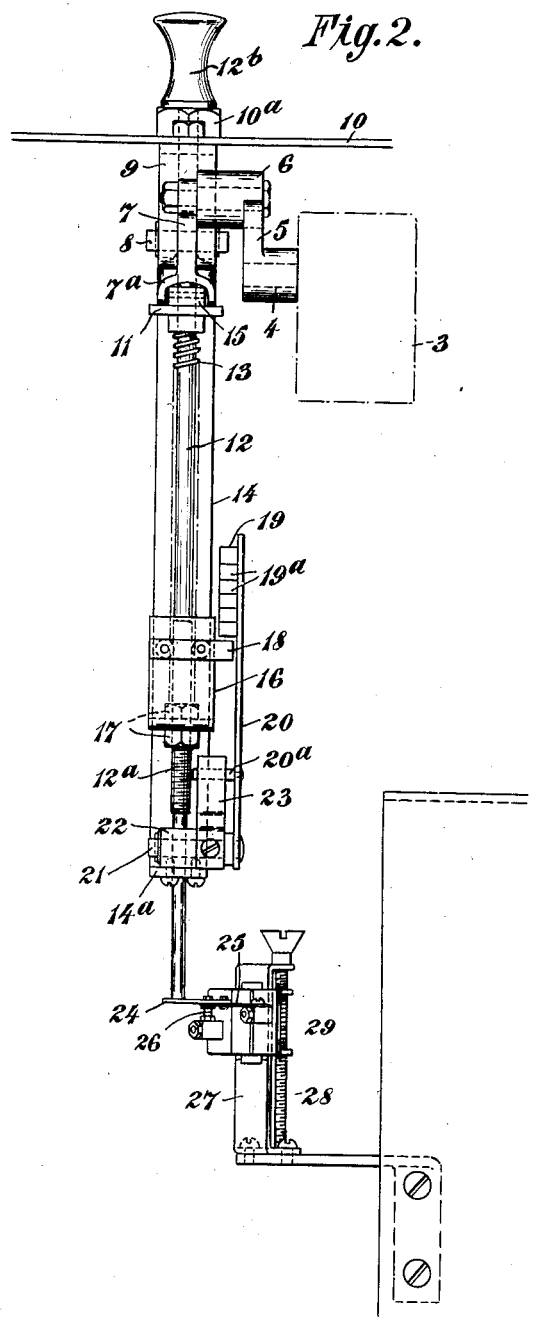

Figure 2 is a side elevation of the mechanism seen in Figure 1.

Similar reference numerals indicate similar parts in the two views.

The totalizing apparatus which is of known kind is illustrated by the dotted rectangle designated 3 and this totalizing apparatus is zeroized by the movement of a resetting shaft 4 which has fixed to a protruding end thereof a crank arm 5 which makes contact with a roller 6 carried at the one end of one arm of a lever 7 which is fulcrumed on the pin 8 in the bracket 9 bolted to the housing 10 containing the weight-indicating mechanism. The other end of the other arm of the lever 7 is forked at 7ª and bears on the upper surface of a loosely mounted flanged bush 11 which is slidable on the rod 12 and is maintained in contact with the lower face of the forked end of the lever 7 by means of a coiled compression spring 13 surrounding part of the rod 12. The rod 12 adjacent its upper end passes through the housing 10 which at this point is provided with a pair of nuts 10ª which are welded to the housing on opposite sides thereof and which constitute bearings or guides for this part of the rod. The lower part of the rod 12 is slidably mounted within the horizontal limb 14ª of a bracket 14 secured to the housing 10. Pinned to the rod 12 is a collar 15 which serves as an abutment for the upper face of the flanged bush 11 and this collar also constitutes a stop to prevent the rod 12 from being wholly withdrawn from its mounting.

Fixed to a screwed section 12ª of the rod 12 is a U-shaped bracket 16 which can be adjusted on the screw-thread by means of the lock nuts 17 the upper of this pair of nuts also constituting an abutment for the lower end of the coiled compression spring 13. One of the vertical limbs of the bracket 16 carries a laterally projecting pawl 18 which is adapted to co-operate with a plurality of ratchet teeth 19ª formed on one edge of a plate 19 which is pinned to the upper end of an upstanding arm 20 fulcrumed at its lower end on a spindle 21 which is carried by a block 22 secured to the horizontal arm 14ª of the bracket 14, the said arm 20 being provided with a laterally projecting pin 20ª which is disposed between a pair of leaf springs 23 secured to the block 22 which location of the pin 20ª between the pair of leaf springs 23 serves to maintain the arm 20 in the vertical position or to restore the arm to the vertical following any disturbance or displacement as will be hereinafter described. The lower end of the rod 12 bears on an insulating plate 24 which is connected to a metallic blade spring 25 which carries one of the contact points 26 of the pair of contacts which constitute a switch in the circuit through the indicating mechanism referred to in the prior specification. The upper end of the rod 12 projects through the housing 10 and is provided with a knob 12ᵇ to facilitate manipulation.

The switch mechanism incorporating the insulating plate 24, the blade spring 25, and the contact points 26 is adjustably mounted on a bracket 27 which in turn is secured to the housing, adjustment being obtained by means of the set screw 28 which determines the position of the switch carrier plate 29 relative to the lower end of the rod 12.

The number of ratchet teeth 19ª is selected so that there is at least one extra tooth beyond the maximum degree of travel which is required to be given to the rod 12 in order to effect a complete zeroizing motion through the lever 7 of the crank arm 5 associated with the spindle 4 of the totalizing apparatus 3.

The operation of the mechanism is as follows:

Normally the coiled spring 13 maintains the rod 12 in its lowermost position, that is the position seen in full lines in the drawings in which position the lower end of the rod 12 makes contact with the insulating plate 24 and maintains the contact points 26 in the closed position. When it is desired to effect a zeroizing of the totalizing apparatus the knob 12ᵇ is pulled upwardly or outwardly and through the rod 12 and the associated flanged bush 11 raises the forked end of the lever 7 to the position seen in dotted lines in Figure 1, rocking the lever 7 so that the roller 6 on the one arm thereof rocks the crank arm 5 and the spindle 4 until this arm 5 occupies the position seen in dotted lines in Figure 1, which angle of motion imparts the necessary movement to the spindle 4 to zeroize the totalizing apparatus in known manner. This upward motion of the rod 12 draws the pawl 18 over the ratchet teeth 19ª, which motion is permitted by the pivotal mounting of the arm 20. When the pawl has passed over the whole of the ratchet teeth 19ª to the position seen in dotted lines in Figure 1, the rod 12 can automatically return to its initial switch-closing position by the pawl passing down the smooth edge of the ratchet plate 19, which action is effected by the coiled compression spring 13 upon release of the knob 12ᵇ. As the spindle 4 and crank arm 5 are spring-loaded in known manner the arm 5 in turn through its contact with the roller 6 returns the lever 7 to its normal position seen in full lines in the drawings, so that the forked end of the lever 7 maintains contact with the upper or outer face of the flanged bush 11. The lifting of the rod 12 permits of the breaking of the contact points 26 owing to the resilience of the blade spring 25 which carries the upper of the pair of points, this break is indicated in dotted lines in Figure 1, and it will be appreciated that while this switch mechanism is in the open position no current can pass through the circuit which operates the weight totalizing mechanism described in the aforesaid specification, the contact points being again closed or re-set when the rod 12 is returned to its normal position by the action of the coiled compression spring 13.

In order to permit of the full stroke of the rod 12 so that the pawl 18 can clear the ratchet teeth 19a irrespective of the angle of motion required by the lever 7 to effect the determined rotation of the spindle 4 through the crank arm 5, there is permitted what may be termed a further upward motion of the rod 12 as determined by the collar 15, in that the rod 12 can freely pass through the flanged bush 11 and this bush is restrained from further upward motion by the lever 7.

It will be appreciated that in order to permit the pawl 18 to properly traverse over the range of all the ratchet teeth 19ª and down the plain edge of the ratchet plate, that a rocking motion has to be permitted to the arm 20 about its pivot 21 and that the arm 20 will automatically be centralized or returned to its normal vertical position owing to the location of the laterally projecting pin 20ª between the pair of blade springs 23.

It will also be appreciated that if the pawl 18 is not traversed the complete distance to permit of its return to the normal position, that is, the pawl is held by any one of the ratchet teeth 19ª, then the rod 12 cannot be returned by the spring 13 to the position at which it will re-make the switch mechanism incorporating the contact points 26, and that in consequence no operation of the weight-indicating mechanism can take place until the complete zeroizing of the totalizing apparatus has been effected.

What I claim is:

In an apparatus for displacement to zeroize a register, and for maintaining a switch open to render the register inoperative, while displaced, in combination, a support, a rod mounted for limited slidable manual displacement relative to said support, a collar slidable on said rod, an operating member biased toward said collar, having a limited range of displacement, a spring surrounding said rod and urging said collar toward said operating member, which spring is capable of overcoming the bias of said operating member, a stop fixed to said rod to limit the displacement of said collar along said rod by said spring, the normal position of said operating member being determined by the normal position of said rod, and the limit of displacement of said rod being in excess of the limit of displacement of said operating member, said operating member, after being displaced to the limit of its displacement, holding said collar stationary relative to said support and thereby compressing said spring while said rod is displaced beyond the limit of displacement of said operating member, to permit such excess displacement of said rod, and a locking device for preventing return of said rod to normal position until it has been displaced beyond the limit of displacement of said operating member.

ARTHUR BINNS.